(12) United States Patent
Reiser et al.

(10) Patent No.: US 8,010,902 B2
(45) Date of Patent: Aug. 30, 2011

(54) METHOD AND SYSTEM FOR TRACKING SOCIAL CAPITAL

(75) Inventors: Peter H. Reiser, Pfungen (CH); Paul Diamond, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 821 days.

(21) Appl. No.: 12/031,533

(22) Filed: Feb. 14, 2008

(65) Prior Publication Data

US 2009/0210799 A1    Aug. 20, 2009

(51) Int. Cl.
*G06F 13/00* (2006.01)
*G06F 15/00* (2006.01)

(52) U.S. Cl. ........................................ 715/761; 715/763

(58) Field of Classification Search .......... 715/763–765, 715/740–745, 851–855

See application file for complete search history.

(56) References Cited

U.S. PATENT DOCUMENTS

2009/0030774 A1* 1/2009 Rothschild et al. ............. 705/10
2009/0077062 A1* 3/2009 Spivack et al. ..................... 707/5

OTHER PUBLICATIONS

Research Disclosure; www.researchdisclosure.com; Oct. 2007, No. 522; 4 pages.

* cited by examiner

*Primary Examiner* — Cao "Kevin" Nguyen
(74) *Attorney, Agent, or Firm* — Osha • Liang LLP

(57) ABSTRACT

In general, the invention relates to a method for tracking social capital. The method includes monitoring interactions with a first shared content provider based on a first number of equity changing activities, where the interactions with the first shared content provider are associated with a user. The method further includes monitoring interactions with a second shared content provider based a second number of equity changing activities, where the interactions with the second shared content provider are associated with the user. The method further includes determining a personal equity for the user based on the interactions with the first shared content provider and the interactions with the second shared content provider and publishing the personal equity to the first shared content provider, where content contributed by the user to the first shared content provider is rated based on the personal equity.

20 Claims, 5 Drawing Sheets

METHOD AND SYSTEM FOR TRACKING SOCIAL CAPITAL

BACKGROUND

An individual participating in a community may be interested in tracking their status in the community. Specifically, an individual may be interested in tracking his contributions and standing in a community. For example, an individual participating in a particular industry may wish to track their contributions and/or reputation in that particular industry.

Typically, an individual may track his contributions to a community manually in a biography (e.g., resume, curriculum vitae, etc.). More specifically, in the case of a resume, the individual may track the individual's professional history, published papers, or other contributions in the community. The resume can then be used by the individual to participate in the community (e.g., apply for jobs, provide support for published papers, etc.).

With the advent of online communities, an individual may also be interested in tracking their status in an online community. For example, an individual's status in a blog may be determined based on the individual's date of registration, the number of views of the blog, and the number of blog entries. Typically, an individual's status in an online community is made available to participants of the same online community. In this case, participants in the online community may consider the individual's status when interacting with the online community. For example, participants may decide to frequent a blog of an individual with a positive status in the online community.

SUMMARY

In general, in one aspect, the invention relates to a method for tracking social capital. The method includes monitoring interactions with a first shared content provider based on a first number of equity changing activities, where the interactions with the first shared content provider are associated with a user. The method further includes monitoring interactions with a second shared content provider based a second number of equity changing activities, where the interactions with the second shared content provider are associated with the user. The method further includes determining a personal equity for the user based on the interactions with the first shared content provider and the interactions with the second shared content provider and publishing the personal equity to the first shared content provider, where content contributed by the user to the first shared content provider is rated based on the personal equity.

In general, in one aspect, the invention relates to a system for tracking social capital. The system includes a shared content provider interface configured to monitor interactions with a first shared content provider based on a first number of equity changing activities, where the interactions with the first shared content provider are associated with a user. The shared content provider interface is further configured to monitor interactions with a second shared content provider based a second number of equity changing activities, where the interactions with the second shared content provider are associated with the user. The shared content provider interface is further configured to publish the personal equity to the first shared content provider, where content contributed by the user to the first shared content provider is rated based on a personal equity. The system further includes a personal equity module configured to determine the personal equity for the user based on the interactions with the first shared content provider and the interactions with the second shared content provider.

In general, in one aspect, the invention relates to a computer readable medium embodying instructions executable by a computer to perform method steps for measuring social capital, the instructions including functionality to monitor interactions with a first shared content provider based on a first number of equity changing activities, where the interactions with the first shared content provider are associated with a user. The instructions further include functionality to monitor interactions with a second shared content provider based a second number of equity changing activities, where the interactions with the second shared content provider are associated with the user. The instructions further include functionality to determine a personal equity for the user based on the interactions with the first shared content provider and the interactions with the second shared content provider and publish the personal equity to the first shared content provider, where content contributed by the user to the first shared content provider is rated based on the personal equity.

Other aspects of the invention will be apparent from the following description and the appended claims.

DETAILED DESCRIPTION

Figure 1:
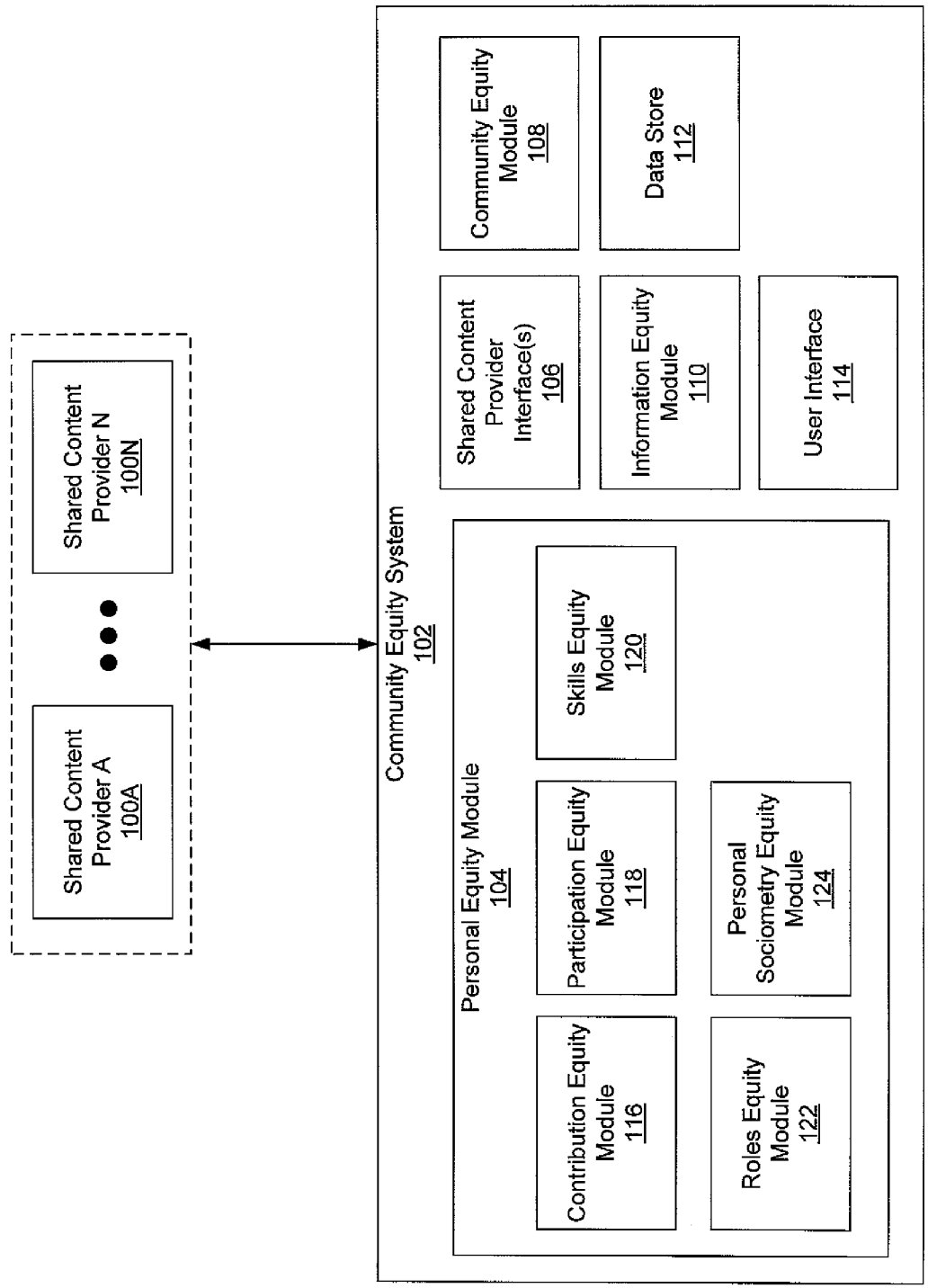
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to method and a system for tracking social capital based on personal equity of the user and information equity of content. More specifically, embodiments of the invention provide a method and system to determine a personal equity of a user based on the user's interactions with a number of shared content providers (e.g., web community, online social network, etc.). In one or more embodiments of the invention, the personal equity of a user may be used by other users when interacting with the user through the shared content providers.

Further, embodiments of the invention provide a method and system to determine an information equity for content of a shared content provider. More specifically, the information equity for content may be determined based on interactions of users with the content. In this case, the information equity of the content may be used to modify the content of the shared content provider.

FIG. 1 shows a system for tracking social capital in accordance with one or more embodiments of the invention. The system includes shared content provider(s) (100A, 100N) interacting with a community equity system (102). The community equity system (102) further includes a personal equity module (104), shared content provider interface(s) (106), a community equity module (108), an information equity module (110), a data store (112), and a user interface (114). The personal equity module (104) further includes a contribution equity module (116), a participation equity module (118), a skills equity module (120), a roles equity module (122), and a personal sociometry equity module (124). Each of the aforementioned components is discussed below.

In one or more embodiments of the invention, shared content provider(s) (100A, 100N) correspond to application(s) that share content among a number of users. More specifically, shared content provider A (100A) may be a web community (e.g., a blog, a wiki, etc.), an online social network (e.g., MYSPACE™, FACEBOOK™, FLICKR™, YOUTUBE™, etc.), a file sharing application, an enterprise human resources system, or some other application for sharing content. MYSPACE™ is a trademark of MySpace™, Inc. located in Los Angeles, Calif. FACEBOOK™ is a trademark of Facebook®, Inc. located in Palo Alto, Calif. FLICKR™ is a trademark of Yahoo!®, Inc. located in Sunnyvale, Calif. YOUTUBE™ is a trademark of YouTube® LLC located in San Bruno, Calif.

In one embodiment of the invention, a blog may be any web site that includes an online personal journal with opinions, comments, and/or references to other web sites provided by a user. In one embodiment of the invention, a wild may be any web site whose content may be modified by any user with access to the wiki (e.g., WIKIPEDIA™, etc.). In one embodiment of the invention, an online social network may be any web site that allows for interactions between users sharing a common interest and/or activities. In one embodiment of the invention, an enterprise human resource system (e.g., PEOPLESOFT ENTERPRISE™, etc) may be any application used by an enterprise to manage employees of the enterprise. WIKIPEDIA™ is a trademark of Wikimedia Foundation, Inc. located in San Francisco, Calif. PEOPLESOFT ENTERPRISE™ is a trademark of Oracle Corporation located in Redwood City, Calif.

Continuing with FIG. 1, a user may be any individual (or entity) interacting with the shared content provider(s) (100A, 100N) or process configured to interact with the shared content provider(s) (100A, 100N). In one or more embodiments of the invention, the user may interact with any number or combination of shared content provider(s) (100A, 100N). For example, the user may access shared content provider(s) (100A, 10N) over the Internet (or other Wide Area Network or Local Area Network) through a web browser (or other interface for communicating over a network). Alternatively, user may interact with shared content provider(s) (100A, 100N) through an application running natively on a user's local computer (not shown). Further, in one or more embodiments of the invention, the shared content provider(s) (100A, 100N) may interact with the user(s) through use of notifications. The notifications may be conveyed by electronic mail, short message service (SMS), or some other form of electronic communication.

In one or more embodiments of the invention, the shared content provider(s) (100A, 100N) interact with the community equity system (102). More specifically, the shared content provider(s) (100A, 100N) may interact with the community equity system (102) through shared content provider interface(s) (106). A shared content provider interface (106) may be configured to monitor a user's interactions with a shared content provider (100A, 100N). More specifically, the shared content provider interface (106) may be configured to monitor the user's interactions with a shared content provider (100A, 100N) based on equity changing activities. For example, the shared content provider interface (106) may be configured to monitor interactions with a shared content provider (100A, 100N) using a Really Simple Syndication (RSS) feed associated with the shared content provider (100A, 100N). In another example, the shared content provider interface (106) may be configured to monitor interactions with a shared content provider (100A, 100N) using an open framework provided by the shared content provider (100A, 100N).

In one or more embodiments of the invention, an open framework of a shared content provider (100A, 100N) may be configured to provide a common interface for accessing information associated with the shared content provider (100A, 100N). For example, an open framework for a blog may allow external applications to retrieve blog information associated with a user (e.g., blog entries by the user, blog entry count of the user, etc.).

In one or more embodiments of the invention, equity changing activities correspond to any activity performed at the shared content provider(s) (100A, 100N) that modifies the social capital (i.e., equity) of a user and/or content. Examples of equity changing activities include, but are not limited to, contributing content, rating content and/or users (i.e., users who contribute content and/or other interact with shared content provider(s)), commenting on content, tagging content, downloading content, viewing content, searching for content and/or users, and creating social connections between users. The social capital of a user may correspond to the user's value in the shared content provider(s) (100A, 100N) based on the value of the user's interactions with the shared content provider(s) (100A, 100N). Equity changing activities and social capital (i.e., equity) are further discussed below in reference to the personal equity module (104).

In one or more embodiments of the invention, the shared content provider interface (106) may be configured to provide and receive equity information from a shared content provider (100A, 100N). More specifically, the shared content provider interface (106) may be configured to interact with an interface plug-in embedded in the shared content provider (100A, 100N). For example, the shared content provider interface (106) may be configured to send equity information for display to the interface plug-in embedded in the shared content provider (100A, 100N). In another example, the shared content provider interface (106) may be configured to accept rating information associated with a user and/or content from the interface plug-in (not shown) embedded in the shared content provider (100A, 100N).

In one or more embodiments of the invention, the interface plug-in is configured to be embedded in a variety (e.g. a blog, a wiki, an online social network, etc.) of shared con tent provider(s) (100A, 100N). More specifically, the interface plug-in may encapsulate functionality for interacting with the community equity system (102) that can be embedded into web site(s) associated with shared content provider(s) (100A, 100N).

In one or more embodiments of the invention, the community equity system (102) may be configured to use the personal equity module (104) to measure social capital (i.e., equity). More specifically, the personal equity module (104) may be configured to determine social capital (i.e., equity) based on interactions monitored by the shared content provider interface(s) (106). The shared content provider interface(s) (106) may also be configured to provide social capital information generated by the personal equity module (104) to the shared content provider(s) (102).

In one or more embodiments of the invention, the personal equity module (104) may be configured to determine the personal equity of a user based on the user's contribution equity, participation equity, skills equity, roles equity, and/or personal sociometry equity. A user's personal equity may correspond to the social capital of the user in shared content provider(s) (100A, 100N). In this case, the personal equity of the user may be determined based on interactions with the shared content provider(s) (100A, 100N), where the interactions are associated with the user.

In one or more embodiments of the invention, an interaction associated with a shared content provider (100A, 100N) may correspond to an equity changing activity. Further, the equity changing activity may be associated with contribution equity, participation equity, skills equity, roles equity, and/or personal sociometry equity. In this case, the equity value (e.g., contribution equity, participation equity, skills equity, roles equity, personal sociometry equity, etc.) of the interaction may be determined using an equity value formula for the equity changing activity associated with the interaction. Determining the equity value of an interaction is further discussed below with respect to FIG. 2B.

In one or more embodiments of the invention, the personal equity module (104) may be configured to use a contribution equity module (116) to determine the contribution equity of an interaction with a shared content provider (100A, 100N). More specifically, contribution equity module (116) may measure the equity value of a user's contributions to a shared content provider (100A, 100N). In one or more embodiments of the invention, example of contributions that are equity changing activities include, but not limited to, creation of content by the user, viewing of the created content, downloading of the created content, bookmarking of the created content, reusing the created content, and rating of the created content.

In one or more embodiments of the invention, the personal equity module (104) may be configured to use a participation equity module (118) to determine the participation equity of an interaction with a shared content provider (100A, 100N). More specifically, participation equity may measure the equity value of a user's participation in a shared content provider (100A, 100N). Participation may correspond to the amount of feedback a user provides for content of a shared content provider. For example, participation that may correspond to equity changing activities including, but not limited to, bookmarking content, reusing content, commenting on content, searching for content, and rating of content.

Optionally, in one or more embodiments of the invention, shared content provider interface(s) (106) may be configured to monitor interactions associated with participation equity by using tags embedded in content. More specifically, a tag embedded in content of shared content provider A (100A) may be used to monitor the file's reuse in shared content provider N (100N). For example, when a file is originally uploaded to the shared content provider A (100A), a source tag may be embedded into the file, where the source tag identifies the shared content provider A (100A) as a source shared content provider of the file. In this example, when the file is downloaded by a user and then uploaded to a shared content provider N (100N), a reuse tag may be further embedded in the file, where the reuse tag identifies the shared content provider N (100N) as a destination shared content provider. The participation equity module (118) may be configured to determine equity value of the reuse of the file based on the embedded source tag and reuse tag.

In one or more embodiments of the invention, the personal equity module (104) may be configured to use a skills equity module (120) to determine the skills equity of a user. More specifically, skills equity may measure the equity value of a user's skills. Skills may correspond to capabilities and/or expertise of the user that are applicable to the shared content provider(s) (100A, 100N). Further, skills may be measured based on equity changing activities including, but not limited to, formal skill assessments, skills tagging, ratings of skills tags, and/or training certification. For example, a user's skill tags may be specified by the user based on the their assessment of their skills. The user's skills tag may then be rated by other users of the shared content provider(s) (100A, 100N) to determine whether they agree with the rating defined in the skills tag. In another example, formal skill assessments may be monitored at an enterprise human resource system. In another example, training certification may be monitored at an online training system.

In one or more embodiments of the invention, the personal equity module (104) may be configured to use a roles equity module (122) to determine the roles equity of user. More specifically, roles equity may measure the equity value of a user's role(s) in an enterprise and/or shared content provider(s) (100A, 100N). A user's role in an enterprise may refer to the user's formal role (e.g., occupation, level of employment, etc.) in the enterprise. In this case, the user's formal role may be monitored at an enterprise human resource system. A user's role in shared content provider(s) (100A, 100N) may refer to informal role(s) in a web community and/or online social network. For example, a user may be an administrator and/or a moderator of a web community. A user's formal and/or informal roles may also be defined at a higher level of granularity (i.e., the user's role in a specific project of an enterprise or a shared content provider (100A, 100N)).

In one or more embodiments of the invention, the personal equity module (104) may be configured to use a personal sociometry equity module (124) to determine the personal sociometry equity of user. More specifically, personal sociometry equity may measure the equity value of a user's social network(s) in shared content provider(s) (100A, 100N). A user's social network in a shared content provider (100A, 100N) may refer to other users of the shared content provider (100A, 100N) that are associated with the user. For example, an online social network may allow a user to specify other users of the online social network as acquaintances. In this example, the personal sociometry equity of the user may be determined based on the personal equity of the user's acquaintances.

In one or more embodiments of the invention, the community equity system (102) may be configured to store information in the data store (112). The data store (112) may be a database, a file system, one or more data structures configured in a memory, an extensible markup language (XML) file, some other medium for storing data, or any suitable combination thereof. Further, the data store (112) may include information (e.g., personal equity, interactions with shared content providers (100A, 100N), timestamps of interactions, equity changing activities, etc.) related to the social capital (i.e., equity) of users and/or content.

In one or more embodiments of the invention, the community equity system (102) may be configured to use the community equity module (108) to determine community equity. More specifically, the community equity module (108) may be configured to determine community equity based on the personal equity of a number of users participating in a community. A community may refer to a grouping of users based on a variety of criteria (e.g., geographic criteria, association with specific shared content provider(s) (100A, 100N), age criteria, etc.). For example, the community equity module (108) may determine the community equity of a country based on the personal equity of all the users in the country. In one or more embodiments of the invention, the shared content provider interface(s) (106) may be configured to provide community equity information to the shared content provider(s) (100A, 100N).

In one or more embodiments of the invention, the community equity system (102) may be configured to use the information equity module (110) to determine information equity. More specifically, the information equity module (110) may be configured to determine information equity based on interactions with content of a shared content provider (100A, 100N). Examples of interactions with content include, but are not limited to, views of the content, downloads of the content, reuses of the content, and/or ratings of the content. In one or more embodiments of the invention, the same interactions may be used by both the personal equity module (104) to determine personal equity and the information equity module (110) to determine information equity.

In one or more embodiments of the invention, the community equity system (102) may be configured to interact with users through the user interface (114). More specifically, the user interface (114) may be configured to provide users with access to social capital (i.e., equity) information. For example, a user may interact with the user interface (114) to view the user's personal equity. The user interface (114) may also be configured to allow users to provide configurations for the community equity system (102). For example, a user may interact with the user interface (114) to specify shared content provider(s) (100A, 100N) for the community equity system (102) to monitor for the user. In another example, a user may interact with the user interface (114) to define configurations for monitoring a shared content provider (100A, 100N). In this example, the user may use the user interface (114) to specify a source (e.g., RSS feed, open framework, etc.) for monitoring interactions of the shared content provider (100A, 100N). Further, the user may also use the user interface (114) to map information provided by the source to equity changing activities. In one or more embodiments of the invention, the shared content provider interface(s) (106) may be configured to monitor interactions of the shared content provider(s) (100A, 100N) based on the user specified configurations.

In one or more embodiments of the invention, the user(s) may access the user interface (114) over the Internet (or other Wide Area Network or Local Area Network) through a web browser (or other interface for communicating over a network). Alternatively, user(s) may interact with the user interface (114) through an application running natively on a user's local computer (not shown). Further, in one or more embodiments of the invention, the user interface (114) may interact with the user(s) through use of notifications. The notifications may be conveyed by electronic mail, short message service (SMS), or some other form electronic communication.

Figure 2A:
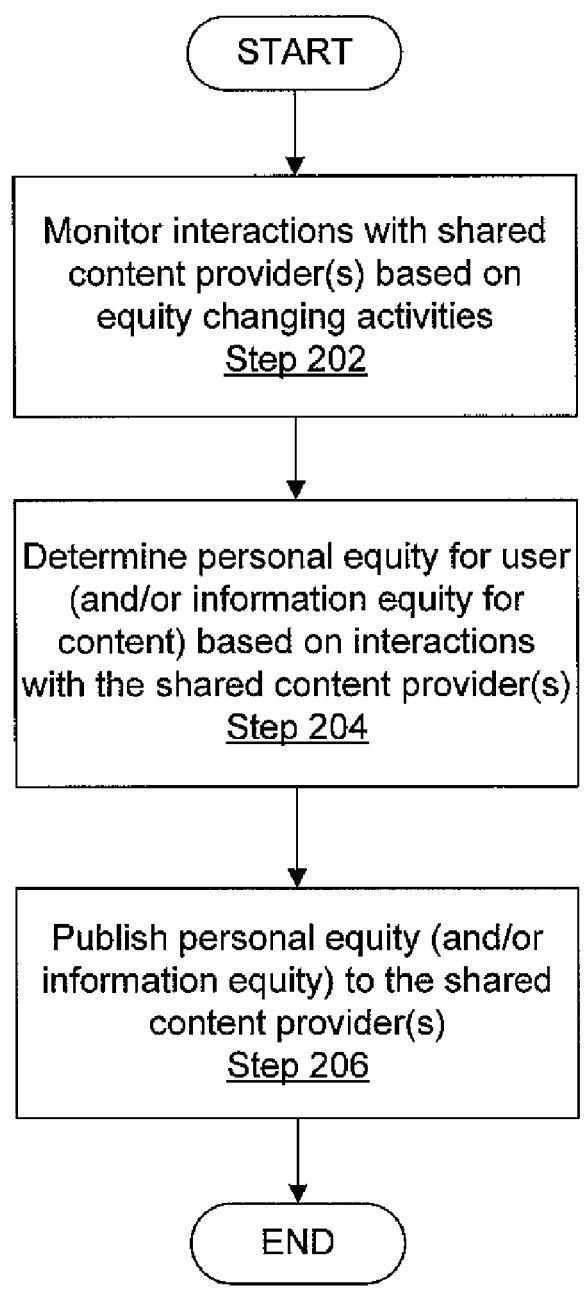
FIGS. 2A-2B show flow charts in accordance with one or more embodiments of the invention.

FIG. 2A shows a flow chart for measuring social capital in accordance with one or more embodiments of the invention. In one or more embodiments of the invention, one or more of the steps shown in FIG. 2A may be omitted, repeated, and/or performed in a different order than that shown in FIG. 2A. Accordingly, the specific arrangement of steps shown in FIG. 2A should not be construed as limiting the scope of the invention.

In Step 202, interactions with shared content provider(s) may be monitored. More specifically, the shared content provider(s) may be monitored for interactions corresponding to equity changing activities, where the interactions are associated with a user. Each shared content provider (or type of shared content provider) may be associated with a different set of equity changing activities. For example, a blog may be associated with equity changing activities including, but not limited to, creation of blog entries, comments on blog entries, and/or rating of blog entries. In another example, a wiki may be associated with equity changing activities including, but not limited to, creation of a page, updating a page, and/or tagging a page.

In one or more embodiments of the invention, the interactions with shared content provider(s) are monitored based on a schedule (e.g., hourly, daily, weekly, etc.). Alternatively, interactions with shared content provider(s) may be monitored in real-time. For example, interaction notifications may be received from interface plug-in(s) embedded in the shared content provider(s) in response to the interactions.

In Step 204, a personal equity may be determined based on the interactions associated with the user. Embodiments of Step 204 are described below in FIG. 2B. More specifically, the equity value of each interaction may be determined and then used to determine the personal equity of the user. The equity value of each interaction may be determined based on an equity changing activity corresponding to the interaction. Those skilled in the art will appreciate that the information related to the interactions monitored in Step 202 may be stored in a data store to be processed at a later time. Further, the interaction information stored may be continually updated based on the monitoring of Step 202. In this case, the personal equity of the user may be determined at any point in time based on the currently stored interaction information.

In one or more embodiments of the invention, the interaction information collected in Step 202 is also used to determine an information equity for content of the shared content provider(s). More specifically, the interactions with the content may be obtained and then used to calculate information equity based on designations of interactions. Those skilled in the art will appreciate that the monitored interactions may be tagged with a variety of designations. For example, an interaction may be tagged based on the user performing the interaction, the content affected by the interaction, users affected by the interaction, or some other designation. In this case, the interactions may then be used to calculate equity (e.g., personal equity, information equity, community equity) based on interactions of a specific designation (e.g., associated user, content affected, a geographic region, shared content provider(s), etc.).

Optionally, in one or more embodiments of the invention, the equity value of an interaction is adjusted based on the timestamp of the interaction (i.e., equity aging). More specifically, equity aging may decrease the equity value of an interaction with the passage of time. For example, the equity value of an interaction may decrease linearly until the equity value becomes zero after a certain period of time.

In Step 206, the personal equity of the user may be published to the shared content provider(s). For example, the personal equity of the user may be sent to the content provider in response to a request for the personal equity. In another example, an interface plug-in displaying the personal equity may be embedded into an application of a shared content provider. Those skilled in the art will appreciate that an interface plug-in may display the personal equity in a variety of formats. For example, the personal equity may be displayed as a numerical value. In another example, the personal equity may be displayed on a graph showing the proportion of the personal equity in comparison to a community equity. In this example, the community equity may be determined based on all interactions associated with the shared content provider. In another example, the personal equity may be incorporated into a listing of personal equities for users (e.g., users with the highest personal equities, users with the lowest personal equities, etc.).

In one or more embodiments of the invention, the information equity of content may also be published to the shared content provider(s). In this case, the information equity may be displayed at a shared content provider in a variety of formats. For example, the content associated with the information equity may include the information equity. In another example, the information equity may be incorporated into a listing of information equities for content (e.g., content with the highest information equities, content with the lowest information equities, etc.).

In one or more embodiments of the invention, equity (e.g., personal equity, information equity, community equity, etc.) may be used by users when interacting with the shared content provider. For example, personal equity of a user may be considered when rating content contributed by the user. In another example, personal equity of a user may be considered when deciding whether to add the user as an acquaintance in a social network. In another example, information equity of content may be considered when dynamically rendering a web site (e.g., suppressing and/or archiving content with low information equity, sorting content based on information equity, etc.).

Figure 2B:
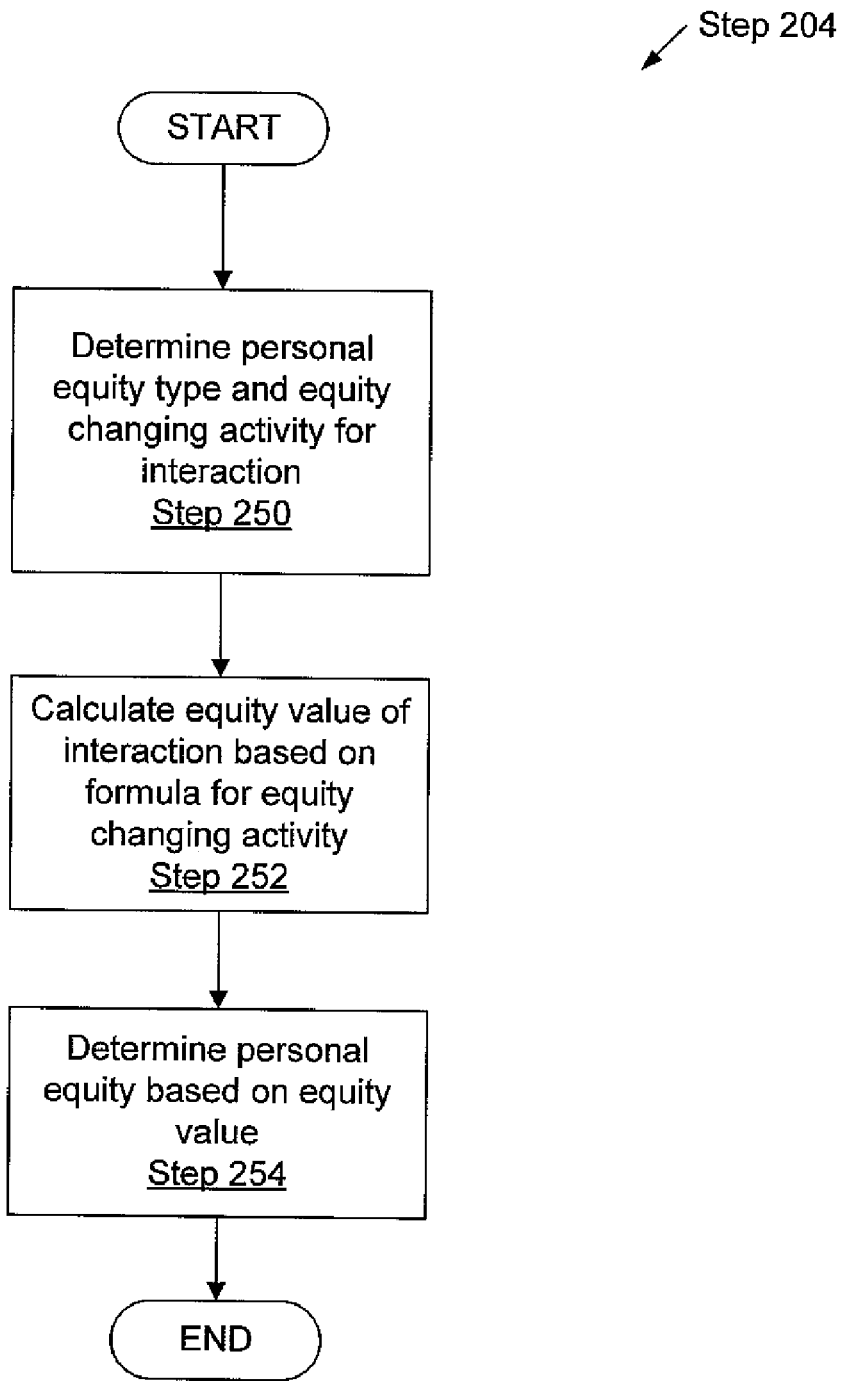

FIG. 2B shows a flow chart for measuring social capital in accordance with one or more embodiments of the invention. In one or more embodiments of the invention, one or more of the steps shown in FIG. 2B may be omitted, repeated, and/or performed in a different order than that shown in FIG. 2B. Accordingly, the specific arrangement of steps shown in FIG. 2B should not be construed as limiting the scope of the invention. Further, the method may describe the determining step described as Step 204 in FIG. 2A above.

In Step 250, a personal equity type and an equity changing activity of an interaction associated with a user may be determined. Examples of personal equity types include, but are not limited to, contribution equity, participation equity, roles equity, skills equity, and personal sociometry equity. Each personal equity type may be associated with a number of equity changing activities. After an equity changing activity is determined, an equity value formula for the equity changing activity may be obtained.

In Step 252, the equity value of the interaction may be calculated using a formula for the corresponding equity changing activity. The following tables include examples of equity changing activities that should not be construed to limit the scope of the invention.

TABLE 1

Contribution Equity

| Equity changing Activity | Equity value formula | Value | Description | Validity | Source |
| --- | --- | --- | --- | --- | --- |
| Creation | Count | 1 | Creation of content | 12 months | Shared content provider |
| View/Hits | Ratio of views to searches | 1 | The number of times users have viewed the title and description, as the result of a search or going directly to that content. | 6 months | Shared content provider |
| Download | Count (or if available, ratio of downloads to views) | 3 (or 1 until ratio is available) | A high ratio indicates that a high number of users have downloaded the content after viewing. | 6 months | Shared content provider |
| Bookmark | Count (or if available, ratio of bookmarks to views) | 1 | A high ratio indicates that a high number of users have bookmarked the content after viewing. | 6 months | Shared content provider |
| Reuse total | Reuse total | 5 | Reuse is good indication that the user found value in the content. | 3 months | Shared content provider |
| Rating | Adjusted value based on rating | 10 | User's assessment of the value of the content | 3 months | Users |

TABLE 2

Blog Contribution Equity

| Equity changing Activity | Equity value formula | Value | Description | Validity | Source |
| --- | --- | --- | --- | --- | --- |
| Creation of blog entry | Count | 1 | Creation of a blog entry by a user | 12 months | Blog |
| Comment | Count | 1 | Not weighed more heavily as it is not possible to detect whether comments are positive or otherwise | 1 month | Blog |

TABLE 2-continued

Blog Contribution Equity

| Equity changing Activity | Equity value formula | Value | Description | Validity | Source |
|---|---|---|---|---|---|
| Rating | Adjusted value based on rating | 2 | User's assessment of the value of the blog entry (each rating may also be weighted by the personal equity of the user at the time at the rating) | 3 months | Users |
| Timestamp | Calculated based on equity aging | 1 | How recently has the user blogged (dynamically generated) | N/A | Blog |

TABLE 3

Wiki Contribution Equity

| Equity changing Activity | Equity value formula | Value | Description | Validity | Source |
|---|---|---|---|---|---|
| Wiki page creation | Count | 1 | Creation of Wiki page | 12 months | Wiki |
| Wiki page update | Count | 1 | The number of contributions and/or edits to a Wiki page (includes updating pages previously created by same user) | 6 months | Wiki |
| Rating | Adjusted value based on rating | 2 | User's assessment of the value of the Wiki page | 3 months | Users |

TABLE 4

File Share Contribution Equity

| Equity changing Activity | Equity value formula | Value | Description | Validity | Source |
|---|---|---|---|---|---|
| Upload file or add link | Count | 10 | Addition of a file or a link to the file share | 12 months | File Share |
| Download file | Count | 3 | Download of file by user | 6 months | File Share |
| Reuse file | Count | 20 | Reuse of file in another file share | 3 months | File Share |
| View metadata of file | Count | 1 | View of metadata associated with the file (i.e., description) | 1 month | File Share |
| Rating | Adjusted value based on rating | 2 | User's assessment of the value of the file | 3 months | Users |
| Comment | Count | 5 | Not weighed more heavily as it is not possible to detect whether comments are positive or otherwise | 3 months | File Share |
| Replace file or link | Count | 5 | Replace existing file | 9 months | File Share |
| Modify metadata | Count | 1 | Modifying existing metadata | 9 months | File Share |
| Modify tags | Count | 1 | Modify tags associated with the file (tags used for searching files in the file share) | N/A | File Share |
| Delete file | Sum of current equity value | −1 | Delete file in file share | N/A | File Share |

Those skilled in the art will appreciate that the entries for equity changing activities in the previous tables may be configurable. For example, attributes (e.g., equity changing activity, equity value formula, value, description, validity, source, etc.) of an entry may be modified based on a user's input. In another example, entries may be created or deleted based on a user's input. In another example, the attributes required for an entry may be configured (e.g., added, removed, modified, etc.) based on a user's input. Further, those skilled in the art will appreciate that attributes for entries may be specified separately for information equity and personal equity. For example, an entry for an equity changing activity may include a one set of attributes (e.g., value, validity, etc.) for information equity and another set of the attributes for personal equity.

Each equity changing activity may be associated with an equity value formula for calculating the equity value of interactions. In one or more embodiments of the invention, the equity value for ratings may be adjusted based on the rating. For example, for a rating scale of one to five, the equity values of the ratings may be: negative ten for a rating of one, a negative six for a rating of two, one for a rating of three, six for a rating of four, and ten for a rating of five. Further, each equity changing activity may be associated with a value. In this case, the value may correspond to the significance of the equity changing activity in determining the equity value of an interaction.

In one or more embodiments of the invention, the validity of an equity changing activity specifies a period of time used in equity aging calculations. More specifically, the validity may be the period of time that passes before the equity value of an equity changing activity reaches zero.

Optionally, in one or more embodiments of the invention, the equity value of an interaction may be further determined using a multiplier associated with the corresponding equity changing activity. In this case, the multiplier may correspond to the additional significance of the interaction based on a variety of factors. Examples of multiplier factors include, but are not limited to, a skills equity of a user performing the interaction, a trust level (i.e., reputation) of the shared content provider for the interaction, and ratings of the user performing the interaction.

In Step 254, the personal equity of the user may be determined based on the equity value of the interaction. In one or more embodiments of the invention, Steps 250 and 252 may be repeated for a number of interactions in order to obtain multiple equity values. In this case, the personal equity may be determined based on the multiple equity values. Each of the number of interactions may correspond to equity changing activities associated with contribution equity, participation equity, skills equity, roles equity, and/or personal sociometry equity.

Figure 3:
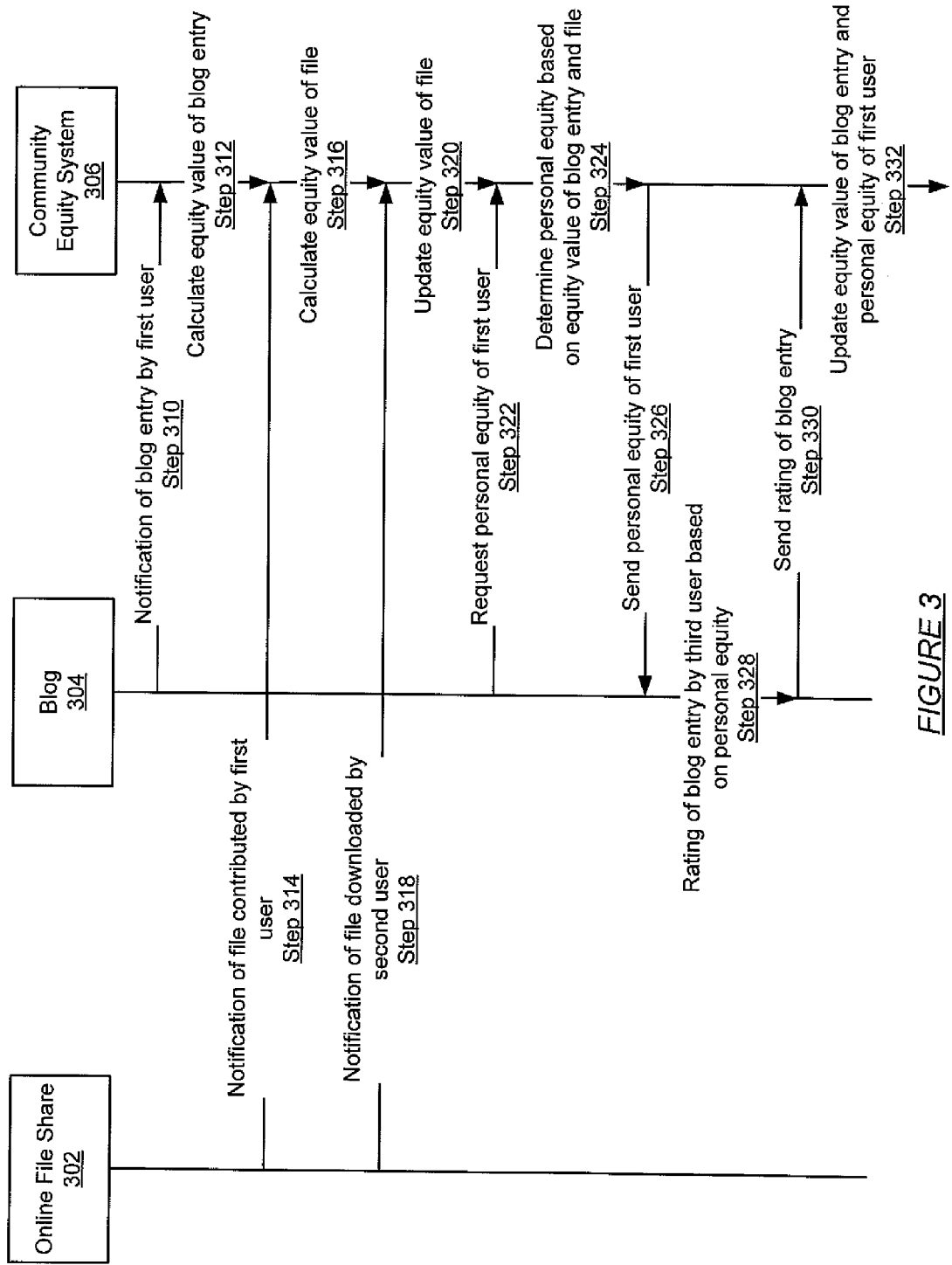
FIG. 3 shows an example in accordance with one or more embodiments of the invention.

FIG. 3 shows an example of measuring and using social capital in accordance with one or more embodiments of the invention. The example should not be construed to limit the scope of the invention.

In Step 310, notification of a blog entry by a first user is received at the community equity system (306). The community equity system (306) is configured to monitor an RSS feed associated with a blog (304) for interactions. When the first user creates the blog entry, the RSS feed associated with the blog (304) may be updated. In response to the update of the RSS feed, the community equity system (306) obtains notification of the blog entry.

In Step 312, the community equity system (306) calculates an equity value for the blog entry. In this example, the equity changing activity is the creation of the blog entry. Further, contribution equity is the personal equity type for the creation of the blog entry. Using Table 1 from the discussion of FIG. 2B, the equity value of the creation of the blog entry is one.

In Step 314, the community equity system (306) then receives notification of a file contributed by the first user. In this case, the community equity system (306) uses an open framework of the online file share (302) to monitor interactions of the first user. In response to receiving the notification of the file, the community equity system (306) calculates the equity value of the contributed file (Step 316). Using Table 1 from the discussion of FIG. 2B, the equity value of the contribution of the file is one.

Next, notification that the file has been viewed and downloaded by a second user may be received at the community equity system (306) (Step 318). In response to receiving the notification, the equity value of the file may be updated (Step 320). Two new interactions associated with the file occurred in Step 318, viewing and downloading the file. Using Table 1 from the discussion of FIG. 2B and assuming that only one search including the file as a result has been performed, the equity value of the viewing of the file is one. Using Table 1 from the discussion of FIG. 2B and assuming that the file has only been viewed once, the equity value of the downloading of the file is three. At this stage, the information equity of the file may be calculated as five, the sum of the equity values of the three interactions associated with the file (i.e., contribution, view, and download).

The community equity system (306) then receives a request from the blog (304) for the personal equity of the first user (Step 322). In response to the request, the community equity system (306) may determine the personal equity of the first user based on the equity value of the blog entry and the equity value of the file (Step 324). Using the equity values calculated in Step 312 and Step 320, the personal equity of the first user is six.

Next, the personal equity of the first user is sent to the blog (304) (Step 326). In response to receiving the personal equity, the blog presents the personal equity to a third user viewing the blog entry. Based on the personal equity, the third user may then rate the blog entry (Step 328). More specifically, the third user may rate the blog entry more leniently because the personal equity of the first user is only six, indicating that the first user is inexperienced.

At this stage, the blog (304) may send the rating of the blog entry to the community equity system (306) (Step 330). In response to receiving the rating, the community equity system (306) updates the equity value of the blog entry and the personal equity of the first user (Step 332). Using Table 1 and the accompanying text from the discussion of FIG. 2B and assuming that the rating is four, the equity value of the rating of the blog entry is six. The information equity of the blog entry is then updated to be seven, the equity value of the creation of the blog and the equity value of the rating of the blog entry. Further, the personal equity of the first user is then updated to be twelve, the equity value of the blog entry and the equity value of the file.

Figure 4:
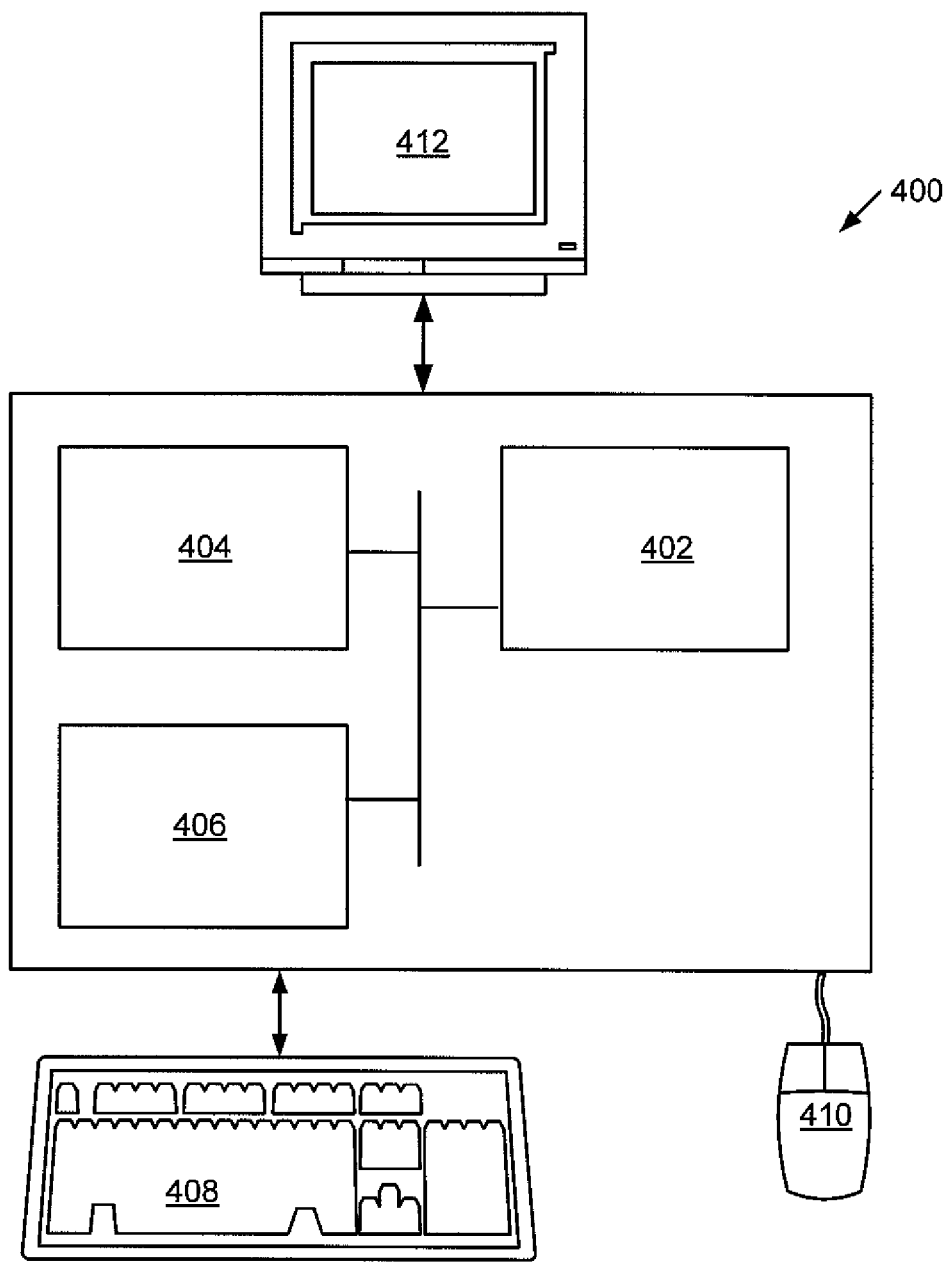
FIG. 4 shows a computer system in accordance with one or more embodiments of the invention.

The invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (400) may be located at a remote location and connected to the other elements over a network.

Further, the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory.

In one or more embodiments of the invention, software instructions to perform embodiments of the invention, when executed by a processor, may be stored on a computer readable medium such as a compact disc (CD), a diskette, a tape, a file, or any other computer readable storage device. Further, one or more embodiments of the invention may be implemented as an Application Program Interface (API) executing on a computer system(s), where the API includes one or more software instructions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracking social capital, comprising:
   monitoring interactions with a first shared content provider based on a first plurality of equity changing activities, wherein the interactions with the first shared content provider are associated with a user;
   monitoring interactions with a second shared content provider based a second plurality of equity changing activities, wherein the interactions with the second shared content provider are associated with the user;
   determining a personal equity for the user based on:
      a contribution equity calculated using the interactions with the first shared content provider, wherein the contribution equity measures a first equity value of content contributed by the user to the first shared context; and
      a skills equity calculated using the interactions with the second shared content provider, wherein the skills equity measures a second equity value of skills of the user; and
   publishing the personal equity to the first shared content provider, wherein the content contributed by the user to the first shared content provider is rated based on the personal equity.

2. The method of claim 1, further comprising:
   identifying content interactions from the interactions with the first shared content provider, wherein the content interactions are interactions with the content contributed by the user;
   wherein calculating the contribution equity of the content contributed by the user is based on the content interactions and a rating of the content contributed by the user.

3. The method of claim 2, wherein the rating of the content contributed by the user is obtained by an interface plug-in embedded in the first shared content provider.

4. The method of claim 1, wherein determining the personal equity for the user comprises:
   calculating a first equity based on the interactions with the first shared content provider and at least one of the first plurality of equity changing activities; and
   calculating a second equity based on the interactions with the second shared content provider and at least one of the second plurality of equity changing activities;
   wherein the personal equity for the user is further determined based on the first equity and the second equity.

5. The method of claim 4, wherein each of the first equity and the second equity is one of a group consisting of a participation equity, a roles equity, and a personal sociometry equity.

6. The method of claim 1, wherein the contribution equity is calculated based on a plurality of equity value formulas, wherein each of the plurality of equity value formulas is associated with one of the first plurality of equity changing activities.

7. The method of claim 1, wherein the personal equity is further determined based on a rating of the content contributed by the user.

8. The method of claim 1, wherein each of the first shared content provider and the second shared content provider is one of a group consisting of a blog, a wiki, a message board, an online social network, an enterprise human resources system, and an online file sharing system.

9. The method of claim 1, wherein the personal equity is one of a plurality of personal equities used for determining a community equity.

10. A system for tracking social capital, comprising:
    a shared content provider interface configured to:
       monitor interactions with a first shared content provider based on a first plurality of equity changing activities, wherein the interactions with the first shared content provider are associated with a user;
       monitor interactions with a second shared content provider based a second plurality of equity changing activities, wherein the interactions with the second shared content provider are associated with the user; and
       publish a personal equity to the first shared content provider, wherein content contributed by the user to the first shared content provider is rated based on the personal equity; and
    a personal equity module configured to determine the personal equity for the user based on
       a contribution equity calculated using the interactions with the first shared content provider, wherein the contribution equity measures a first equity value of the content contributed by the user to the first shared context; and
       a skills equity calculated using the interactions with the second shared content provider, wherein the skills equity measures a second equity value of skills of the user.

11. The system of claim 10, further comprising:
    an information equity module configured to:
    identify content interactions from the interactions with the first shared content provider, wherein the content interactions are interactions with the content contributed by the user;
    wherein the personal equity module is configured to calculate the contribution equity of the content contributed by the user based on the content interactions and a rating of the content contributed by the user.

12. The system of claim 11, wherein the rating of the content contributed by the user is obtained by an interface plug-in embedded in the first shared content provider.

13. The system of claim 10, wherein determining the personal equity for the user comprises:
    calculating a first equity based on the interactions with the first shared content provider and at least one of the first plurality of equity changing activities; and
    calculating a second equity based on the interactions with the second shared content provider and at least one of the second plurality of equity changing activities;

wherein the personal equity for the user is further determined based on the first equity and the second equity.

14. The system of claim 13, wherein the contribution equity is calculated based on a plurality of equity value formulas, wherein each of the plurality of equity value formulas is associated with one of the first plurality of equity changing activities.

15. The system of claim 13, wherein each of the first equity and the second equity is one of a group consisting of a participation equity, a roles equity, and a personal sociometry equity.

16. The system of claim 10, wherein the personal equity is further determined based on a rating of the content contributed by the user.

17. The system of claim 10, wherein each of the first shared content provider and the second shared content provider is one of a group consisting of a blog, a wiki, a message board, an online social network, an enterprise human resources system, and an online file sharing system.

18. The system of claim 10, further comprising a community equity module configured to determine a community equity based on a plurality of personal equities, wherein the personal equity is one of a plurality of personal equities.

19. A computer readable medium, embodying instructions executable by the computer to perform method steps for measuring social equity, the instructions comprising functionality to:
monitor interactions with a first shared content provider based on a first plurality of equity changing activities, wherein the interactions with the first shared content provider are associated with a user;
monitor interactions with a second shared content provider based a second plurality of equity changing activities, wherein the interactions with the second shared content provider are associated with the user;
determine a personal equity for the user based on:
a contribution equity calculated using the interactions with the first shared content provider, wherein the contribution equity measures a first equity value of content contributed by the user to the first shared context; and
a skills equity calculated using the interactions with the second shared content provider, wherein the skills equity measures a second equity value of skills of the user; and
publish the personal equity to the first shared content provider, wherein the content contributed by the user to the first shared content provider is rated based on the personal equity.

20. The computer readable medium of claim 19, the instructions further comprising functionality to:
identify content interactions from the interactions with the first shared content provider, wherein the content interactions are interactions with the content contributed by the user;
wherein calculating the contribution equity of the content contributed by the user is based on the content interactions and a rating of the content contributed by the user.

* * * * *